United States Patent
Madan et al.

(10) Patent No.: US 12,079,198 B2
(45) Date of Patent: Sep. 3, 2024

(54) METHOD FOR LINEAGE SAMPLING TO EFFICIENTLY DETECT CORRUPTIONS

(71) Applicant: Dell Products L.P., Round Rock, TX (US)

(72) Inventors: Nitin Madan, Cupertino, CA (US); Bhimsen Bhanjois, Fremont, CA (US); Kiran Kumar Malle Gowda, Bangalore (IN)

(73) Assignee: DELL PRODUCTS L.P., Round Rock, TX (US)

(*) Notice: Subject to any disclaimer, the term of this patent is extended or adjusted under 35 U.S.C. 154(b) by 50 days.

(21) Appl. No.: 17/936,983

(22) Filed: Sep. 30, 2022

(65) Prior Publication Data

US 2024/0111752 A1   Apr. 4, 2024

(51) Int. Cl.
*G06F 16/23* (2019.01)
*G06F 11/14* (2006.01)

(52) U.S. Cl.
CPC ...... *G06F 16/2365* (2019.01); *G06F 11/1451* (2013.01); *G06F 2201/84* (2013.01)

(58) Field of Classification Search
CPC .................................................. G06F 16/2365
See application file for complete search history.

(56) References Cited

U.S. PATENT DOCUMENTS

2022/0083529 A1* 3/2022 Jain ..................... G06F 16/2358

* cited by examiner

*Primary Examiner* — Baoquoc N To
(74) *Attorney, Agent, or Firm* — Workman Nydegger

(57) ABSTRACT

Corruption detection in backups is disclosed. Backups that are received into a backup environment are stored in corresponding lineages. A detection engine is configured to perform corruption detection operations on the most recent backups in each of the lineages based on a sample frequency. Corruption detection operations may also be performed randomly and based on unexpected or unusual changes in backup metadata.

19 Claims, 5 Drawing Sheets

METHOD FOR LINEAGE SAMPLING TO EFFICIENTLY DETECT CORRUPTIONS

FIELD OF THE INVENTION

Embodiments of the present invention generally relate to data protection. More particularly, at least some embodiments of the invention relate to systems, hardware, software, computer-readable media, and methods for data protection operations including corruption detection operations.

BACKGROUND

The primary function of data protection systems is to protect production data by generating backups of the production data. In the event that the production data cannot be used, the backups allow an entity to resume operations by recovering production data from a backup. For example, production data/applications may be negatively impacted by malware. In this case, the production data can be restored from a backup of the production data that is not affected by the malware.

Given the increasing sophistication of malware, it is difficult to ensure that the backup is not infected with the same malware. While a backup could be restored to a testing system and tested prior to restoring to the production system, this is expensive in terms of cost and time.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection and data protection operations. More particularly, at least some embodiments of the invention relate to systems, hardware, software, computer-readable media, and methods for performing data protection operations including corruption detection operations, sampling operations, and statistical operations.

Embodiments of the invention are directed to determining whether a backup is corrupted. Stated differently, embodiments of the invention facilitate the identification of backups that are suitable for restore operations. By way of example and without limitation, a backup is corrupted when the backup contains malware, ransomware, unauthorized content, unwanted content, or the like or is otherwise compromised.

Corruption detection operations relate to the process of evaluating/scanning a backup. In one example, a backup is evaluated or scanned using a machine learning model to detect malware or other corruption patterns. The machine learning model may be trained to detect patterns or configurations that may be malware or other unwanted content. To be effective, evaluating or scanning a backup requires the backup to be read. However, many backup systems are designed for write intensive workloads, and may have limitations with regard to read intensive workloads.

Figure 1:
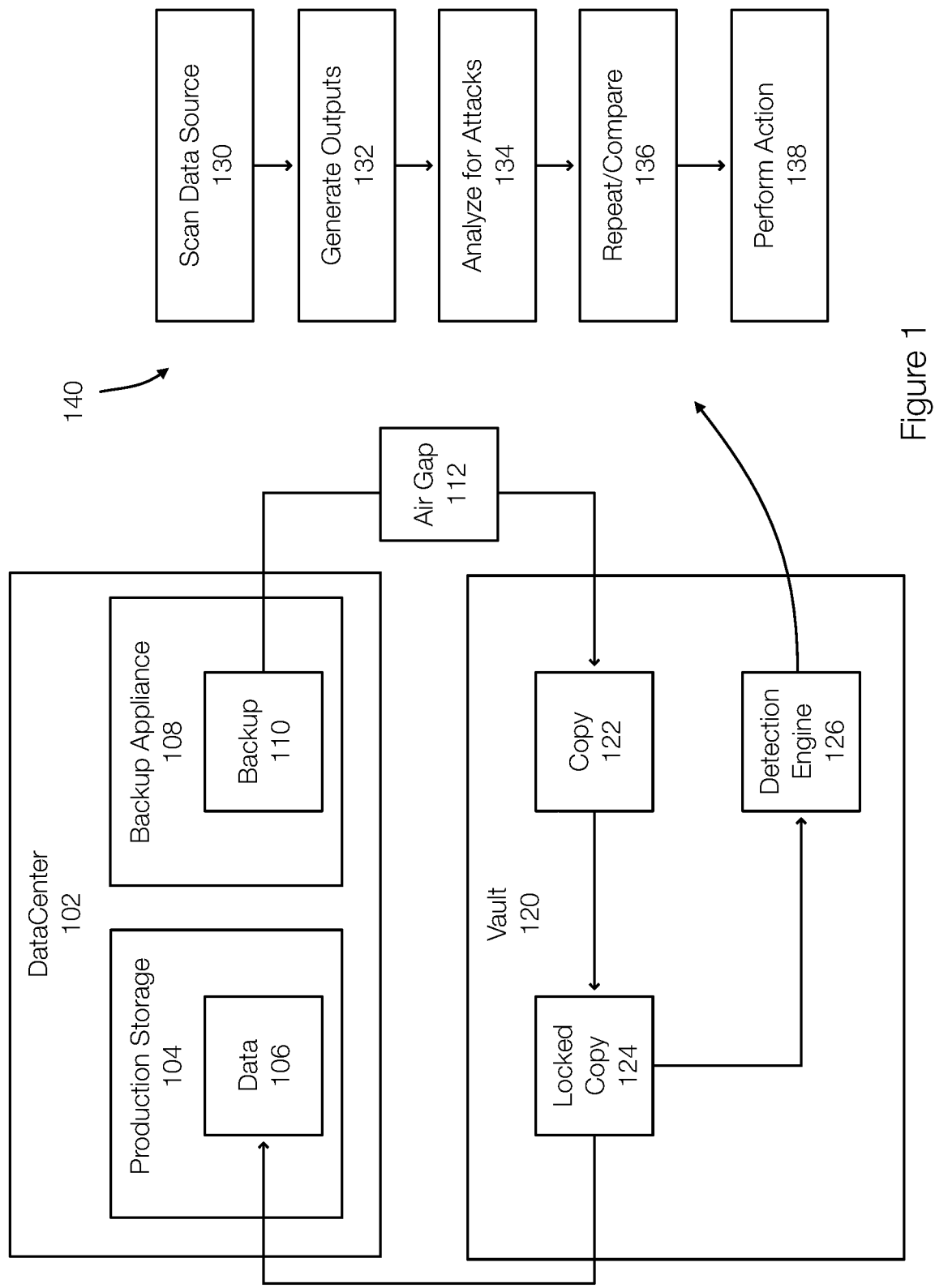
FIG. 1 discloses aspects of a production system and a backup system and discloses aspects of evaluating backups for corruption.

FIG. 1 discloses aspects of data protection operations, which include corruption detection operations. FIG. 1 illustrates a datacenter 102. The datacenter 102 includes production storage 104 that stores production data 106. Although FIG. 1 illustrates production storage 104 of a datacenter, the production storage 104 may be an on-premise storage system, an edge system storage, or the like. The production stores production data 106 and the production storage 104 may include storage devices such as hard disk drives. The datacenter 102 may also host applications associated with the data 106.

A backup appliance 108 is configured to generate a backup 110 of the data 106. The backup appliance 108 may be a physical appliance, a virtual appliance, or the like. PowerProtect Data Domain is an example of the backup appliance 108.

More generally, the backup appliance 108 may protect data, applications, or the like. The backup appliance 108 may transmit the backup 110 to a vault 120, which may be protected by an air gap 112 controlled by the value 120. This allows a copy 122 of the data 106 to be stored in the vault 120 only when a connection is available. After ingestion, the copy 122 is locked to generate a locked copy 124. The locked copy 124 is immutable in one example. The vault 120 may be created in the datacenter 102 or in another location that is remote from the data 106 and/or the backup appliance 108.

During a recovery operation, the data 106 may be recovered from the locked copy 124 (or other backup). In some examples, the data 106 may be recovered from the copy 122 if necessary.

In one example, the backup 110 may be a namespace that is backed up to a namespace in the vault 120. The backup 110 may be transmitted to a namespace in the vault 120 as the copy 122. Nest, the copy 122 may be copied to another namespace and retention locked, which results in the locked copy 124.

The air gap 112 may not be required but provides a more secure backup environment. Once the locked copy 124 is generated and retention locked, the immutability is guaranteed in one example. For example, the locked copy 124 is secure from attack vectors that adversely impact backups because the vault 120 is not accessible, due to the air gap 112, which is controlled from inside the vault 120 in one example.

Once the locked copy 124 is generated or locked, a detection engine 126 may be used to evaluate or scan the locked copy 124. The detection engine 126 reads or accessed the locked copy 124 and evaluates the data. The detection engine 126 may perform various processes, which may include machine learning models, to determine whether the locked copy 124 is compromised (e.g., includes malware).

The detection engine 126 may scan the locked copy 124 for patterns that indicate malware or ransomware.

The evaluation is reflected in the method 140. Initially, the detection engine 126, which may also be an appliance or an application, may scan 130 the data source, which is the locked copy 124 in this example. Scanning 130 the data source includes reading the data from the storage device. The detection engine 126 may generate 132 outputs such as statistics, inferences, probabilities, or the like regarding the locked copy 124. More generally, the locked copy 124 is scanned for patterns or other indicia of malware, ransomware, or other unwanted content.

The outputs are analyzed 134 to determine whether the locked copy 124 is "clean" or presumed to not include malware, ransomware or other unwanted content. This process is repeated 136 on multiple backups, which also allows the analysis of a specific backup to be compared 136 to the results associated with the analysis of other backups. For example, the analysis of two backups in the same lineage may provide insight regarding the content of those backups. Depending on the results of the analysis, an action is performed 138. This may include generating a report, performing additional investigation, deleting the backup, marking the backup as suitable for recovery, alerting an administrator, or the like.

Figure 2:
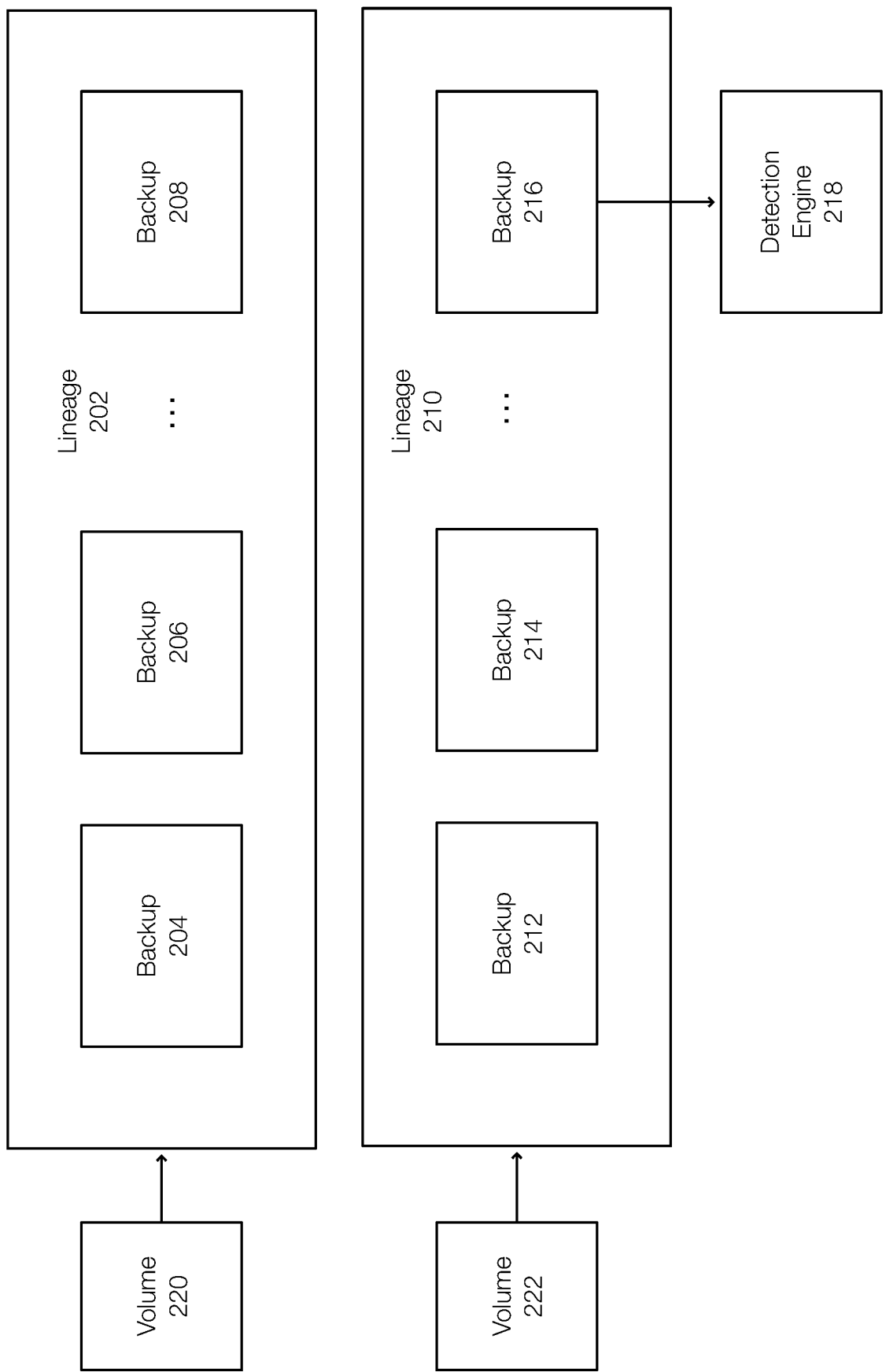
FIG. 2 discloses aspects of lineages and the backups included in different lineages.

FIG. 2 discloses aspects of analyzing backups. When generating backups, a backup appliance may be configured to generate backups from multiple clients. For example, a client may include or refer to an application, a volume, a device, a cluster, or a machine in a production system. Each client may be associated with a different backup. For example, a client may be associated with a consistency group, which consistency group includes multiple volumes associated with a specific application. Thus, the client may participate in generating a backup the consistency group. A client may be associated with a storage device, which may have multiple volumes. A client may be associated with each individual volume. More generally, the manner in which data is protected may be configured in many different manners.

The following discussion assumes that each backup corresponds to a volume in a production environment. FIG. 2 this illustrates a volume 220, whose data is backed up according to a daily cadence. The backups of the volume 220 can be represented as a lineage 202. The lineage 202 thus includes backups represented by, in chronological order, backup 204 (oldest), backup 206, and backup 208 (most recent). Similarly, the lineage 210 of the volume 222 includes the backups represented by backups 212, 214, and 216.

Backups have different forms including always full backups, incremental backups, and synthetic backups. When generating always full backups, the data protection system transmits a full backup each time a backup operation is performed. This method provides a snapshot for restore operations but has a high IO (Input/Output) and network cost.

When incremental backups are performed, a full backup is performed initially. After the full backup is performed, incremental backups are generated. Each incremental backup includes changes since the most recent backup. As a consequence, recovering data requires the data to be constructed from the most recent full backup and intervening incremental backups. While incremental backups to not have the IO cost of full backups, recovering or restoring data is more complicated than recovering from a full backup (e.g., a snapshot).

Synthetic full backups have the benefits of full backups and incremental backups. A synthetic backup is generated by combining incremental backups in one example. Thus, incremental backups are generated and transmitted from the source and synthetic full backups are generated at the target. For example, incremental backups may be generated at the source or at the production data and, at the target, synthetic full backups are generated.

Returning to FIG. 2 and assuming that each of the lineages 202 corresponds to a production volume, the lineage 202 includes synthetic backups 204, 206, and 208 of the volume 220. However, the data received by the vault may be an incremental backup that is used to generate another synthetic backup.

The method 140, when performed, is applied to the entire backup. Thus, the detection engine 218 evaluates the entire backup (e.g., the backup 216), regardless of size or type. More specifically, as backups are added to lineages in the vault or other backup environment, the detection engine 218 may examine each of the backups. This allows each backup in each of the lineages to be evaluated.

However, because this places a heavy read requirement on backup appliance or other backup storage system, embodiments of the invention perform corruption detection operations using or based on a sample frequency. As previously disclosed, a data protection system may generate multiple lineages. Using a sample frequency, embodiments of the invention ensure that all of the lineages of the backup appliance can be scanned (e.g., deterministically scanned) with the sample frequency. In some instances, some backups may be skipped. Embodiments of the invention may also allow for multiple sample frequencies.

Figure 3:
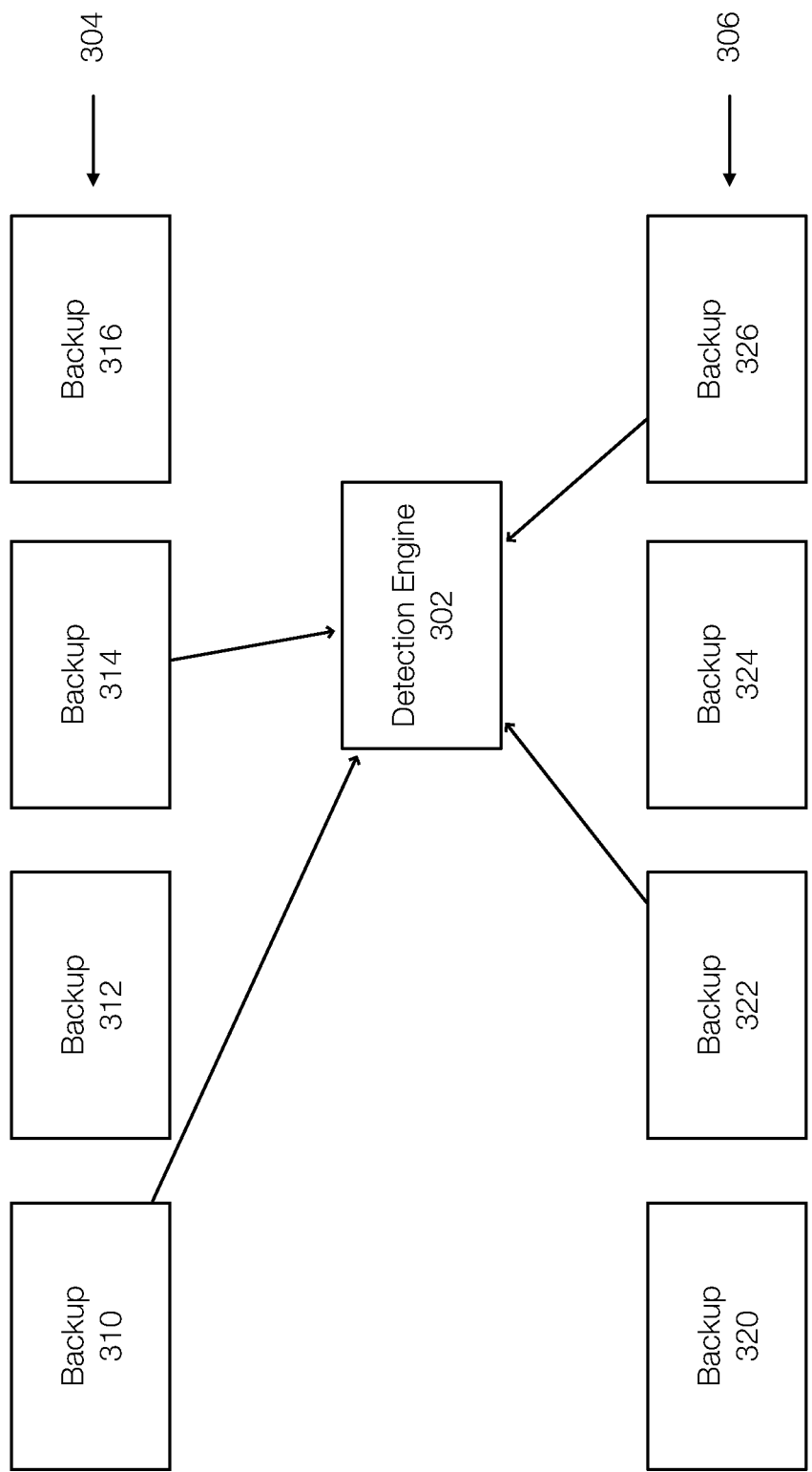
FIG. 3 discloses aspects of corruption detection using a sample frequency.

FIG. 3 discloses aspects of a detection engine configured to perform corruption detection operations with a sample frequency. FIG. 3 illustrates a lineage 304 that includes backups 310, 312, 314, and 316. The lineage 306 includes backups 320, 322, 324, and 326. In this example, the backups in the lineages 304 and 306 are full backups and/or synthetic backups.

In this example, the backups in the lineages 304 and 306 are generated on a daily basis and the sample frequency for these lineages 304 and 306 is two. The sample frequency of two implies that the latest generation (backup) in each lineage is scanned once in 2 days. This may be independent of the backup cadence. For example, the backup cadence of the lineage 304 may be twice daily. With a sample frequency of 2, this indicates that the latest backup is scanned every other day. As a result, some of the backups may not be scanned. However, this can be adjusted based on the scan bandwidth of the backup environment, the relative importance of the backups, and/or on other factors.

More specifically, the ability to analyze the backups in the lineages 304 and 306 may be constrained by a read or scan capacity of an appliance or of the vault or, more generally, of the backup or vault environment. In order to reduce reading or scanning requirements, the lineages are read or scanned on different days (or other periods). For example, the backups 310 is scanned on day 1, the backup 222 is scanned on day 2, the backup 314 is scanned on day 3, and the backup 326 is scanned on day 4. The backups 312, 316, 320, and 324 may be skipped in this example.

If this example is expanded to 100 lineages, a backup from each of the lineages 1-50 may be scanned on the first day and a backup from each of the lineages 51-100 are scanned on the second day. On day 3, the most recent backup is scanned for each of lineages 1-50 and, on day 4, the most recent backup is scanned for each of lineages 51-100.

Further, assume in this example that scanning lineages 1-50 requires 24 hours and that scanning lineages 51-100 requires 24 hours. Because the malware likely has an equal distribution, the malware would be detected (statistically) at 12 hours when scanning backups of the lineages 1-50 after the backup landed in the vault or backup environment or 36 hours when scanning the backups of the lineages 51-100.

In this example and with a sample frequency of 2, the amount of data read is reduced by 50%. However, the detection time has not doubled.

In another example, the lineages 304 and 306 may have different importance or criticality. The lineage 304 may be critical and the lineage 306 may be important, but not critical. This allows each lineage to be associated with a Quality of Service (QoS) metric, which can be reflected in the sample frequency. The quality-of-service metric may indicate that certain lineages must be scanned daily while other lineages can be scanned less frequently (e.g., once a week).

Further, the number of backups that can be scanned each day may be impacted by the amount of data that can be scanned (read) each day. For example, the logical size of the files or backups to be scanned must be less than or equal to the read/scan capacity of the data protection system. The cumulative system can be sized by the following rule, where f is the sample frequency:

$$\sum \frac{1}{f} * (\text{size of the files}) \leq \text{Total scan bandwidth}$$

The rule can be adapted to account for lineages with different sample frequencies. However, the total size being read should not be greater than the total scan bandwidth.

The sample frequency for a given lineage can be determined in a variety of ways and is adaptable to the total scan bandwidth. For example, the sample frequency may be set based on the storage tier. Backups stored in a "gold" tier may be scanned more frequently than backups stored in a "silver" tier.

In another example, the backups may include metadata. The backup appliance, for example, or the application can set a sample frequency as part of the backup's metadata. The metadata or attributes can be read and respected by the backup or vault environment.

In another example, a sample frequency may be subject to an attack vector. For example, a lineage that is subject to a scan every 7 days may be targeted by a malicious actor. The malicious actor may cause malware to be added after a scan and removed prior to the next scan. As a result, the scanned backups do not include the malware. The other backups that were not scanned, however, include the malware. This thus reduces the number of "good" or "clean" backups.

Embodiments of the invention may, in addition to a sample frequency, also conduct random scans. This allows the detection engine to detect malware attempting to evade detection based on the sample frequency.

In another example, metadata of the backups may be tracked. A scan performed by the detection engine can be triggered when suspicious changes are detected in the metadata. For example, erratic or unusual IO patterns, large changes to the size of a file, or the like may trigger a scan by the detection engine. This allows results from previous corruption detection operations to improve the output or results of subsequent corruption detection operations. More generally, malware may be detected in other manners. When malware is detected, whether in a current backup or an earlier backup, the scan operation may be triggered or performed. Further, the scan operation may not be in order.

Figure 4:
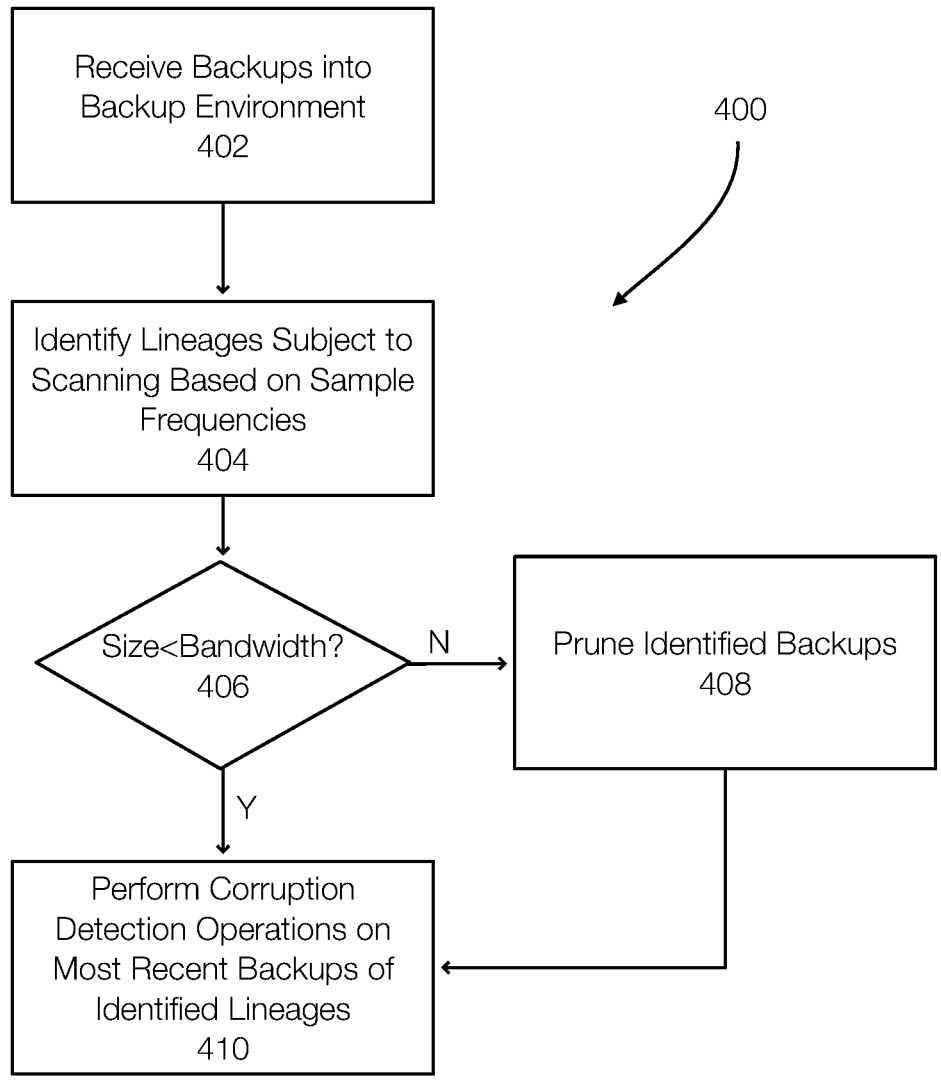
FIG. 4 discloses aspects of detecting corrupted backups.

FIG. 4 discloses aspects of performing corruption detection operations. The method 400 is an example of a data protection operation. The method 400 includes receiving 402 backups into a backup environment. As illustrated in FIG. 1, a backup 110 generated by a backup appliance 108 may be received into a backup environment such as a vault 120. The vault 120 may be another backup appliance or other storage system that may be accessed (or not) via an air gap 112. When the copy 122 arrives at the vault 120 and the locked copy 124 is generated, the backup has landed at the backup environment.

The detection engine identifies 404 lineages subject to the corruption detection operations. The detection engine may evaluate the sample frequency associated with each lineage to identify which lineages should be scanned. Identifying 404 lineages may also include some randomly selected lineages. Once the lineages are identified, the logical size of the backups is determined and compared to a scan (read) bandwidth. If the cumulative size of the backups to be scanned is less than the bandwidth (or capability of the backup environment) (Y at 406), then the detection operations are performed 410 on the most recent backups in the identified lineages.

If the logical size of the backups of the selected lineages is greater than the available bandwidth or capacity (N at 406), some of the lineages may be pruned 408. For example, lineages with a lower sample frequency (e.g., 7 days compared to 2 days) may be delayed or skipped. Alternatively, backups in a lower tier storage may be delayed or skipped. After the size is brought down to below or equal to the bandwidth, the corruption operation is performed on the remaining backups of the remaining lineages.

It may not be necessary to apply a sample frequency to incremental backups, which may all need to be scanned. However, the size of an incremental backup is comparatively small to the size of a synthetic or full backup and may not burden the operation of the appliance.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, corruption detection operations, vault operations, scanning operations, machine learning operations, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the PowerProtect DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving backups into a backup environment configured to store the backups, wherein the backups associated with corresponding lineages, wherein each of the lineages is associated with a sample frequency, selecting lineages subject to a corruption detection operation based on the sample frequencies of the lineages, and performing the corruption detection operation on a most recent backup or each of the selected lineages.

Embodiment 2. The method of embodiment 1, wherein the backups comprise synthetic full backups and wherein the corruption detection operation is not performed on some of the backups in some of the lineages.

Embodiment 3. The method of embodiment 1 and/or 2, wherein the sample frequency for some lineages is different from the sample frequency of other lineages.

Embodiment 4. The method of embodiment 1, 2, and/or 3, wherein the sample frequency is included in metadata associated with the backups.

Embodiment 5. The method of embodiment 1, 2, 3, and/or 4, further comprising selecting at least one of the lineages randomly rather than the associated sample frequency.

Embodiment 6. The method of embodiment 1, 2, 3, 4, and/or 5, further comprising determining whether a logical size of the most recent backups is less than or equal to a capacity threshold of the backup environment, wherein the selected lineages are pruned when the logical size is greater than the capacity threshold.

Embodiment 7. The method of embodiment 1, 2, 3, 4, 5, and/or 6, further comprising pruning based on a criticality of the selected lineages.

Embodiment 8. The method of embodiment 1, 2, 3, 4, 5, 6, and/or 7, further comprising triggering dynamic scans based on metadata changes.

Embodiment 9. The method of embodiment 1, 2, 3, 4, 5, 6, 7, and/or 8, wherein metadata changes that trigger dynamic scans include a file size change greater than a threshold amount or an unexpected input/output (IO) pattern.

Embodiment 10. The method of embodiment 1, 2, 3, 4, 5, 6, 7, 8, and/or 9, wherein the backup environment comprises a physical or virtual appliance that is accessed via an air gap.

Embodiment 11. A method for performing any of the operations, methods, or processes, or any portion of any of these, or any combination thereof, disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
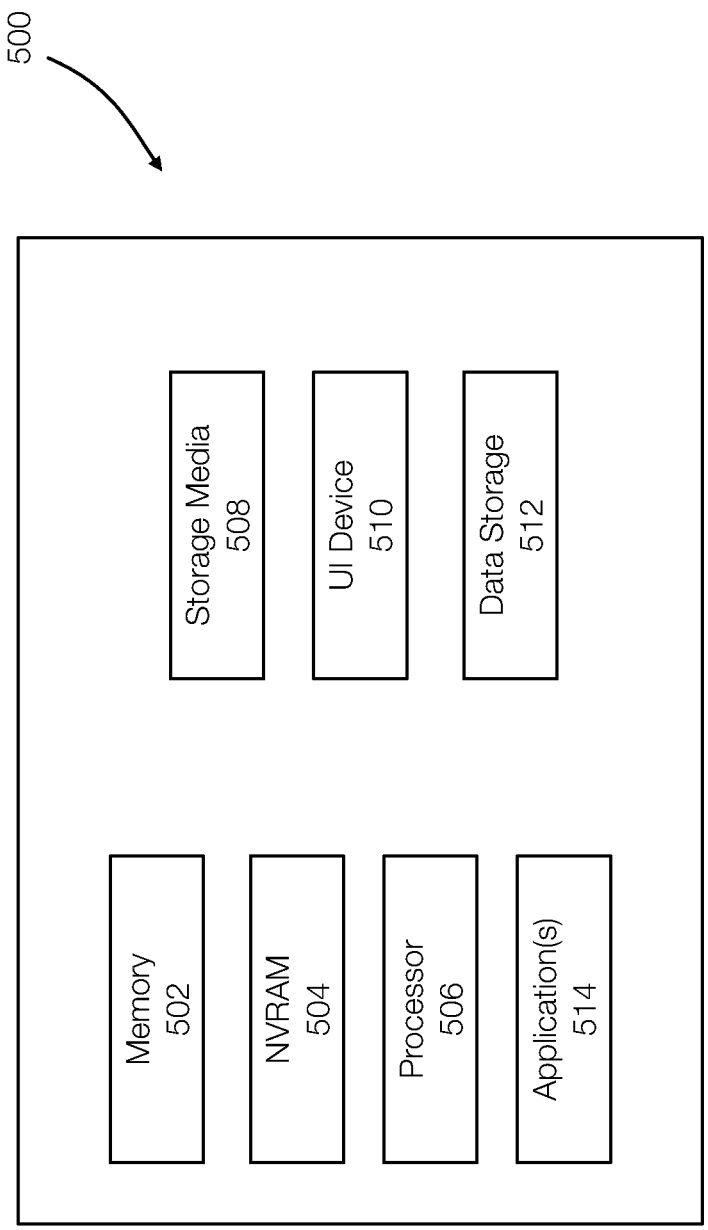
FIG. 5 discloses aspects of a computing device, a computing system, or entity.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A non-transitory storage medium having stored therein instructions that are executable by one or more hardware processors to perform operations for performing a corruption detection operation that includes read operations in a data protection system, the operations comprising:

receiving the backups into the data protection system configured to store the backups, wherein the backups are associated with corresponding lineages, wherein each of the lineages is associated with a sample frequency, wherein the sample frequency for some lineages is different from the sample frequency of other lineages;

selecting lineages subject to the corruption detection operation based on the sample frequencies of the lineages; and performing the corruption detection operation on a most recent backup in each of the selected lineages according to the associated sample frequency; and determining whether a logical size of the most recent backups is less than or equal to a capacity threshold of the backup environment, wherein the selected lineages are pruned when the logical size is greater than the capacity threshold.

2. The non-transitory storage medium of claim 1, wherein the backups comprise synthetic full backups and/or always full backups and wherein the corruption detection operation is not performed on some of the backups in some of the lineages.

3. The non-transitory storage medium of claim 1, wherein the sample frequency for some lineages is different from the sample frequency of other lineages.

4. The non-transitory storage medium of claim 1, wherein the sample frequency is included in metadata associated with the backups.

5. The non-transitory storage medium of claim 1, further comprising selecting at least one of the lineages randomly rather than the associated sample frequency.

6. The non-transitory storage medium of claim 1, further comprising pruning based on a criticality of the selected lineages.

7. The non-transitory storage medium of claim 1, further comprising triggering dynamic scans based on metadata changes.

8. The non-transitory storage medium of claim 7, wherein metadata changes that trigger dynamic scans include a file size change greater than a threshold amount or an unexpected input/output (IO) pattern.

9. The non-transitory storage medium of claim 1, wherein the backup environment comprises a physical or virtual appliance that is accessed via an air gap.

10. A method for performing a corruption detection operation that includes read operations in a data protection system comprising:

receiving the backups into the data protection system configured to store the backups, wherein the backups are associated with corresponding lineages, wherein each of the lineages is associated with a sample frequency, wherein the sample frequency for some lineages is different from the sample frequency of other lineages;

selecting lineages subject to the corruption detection operation based on the sample frequencies of the lineages;

performing the corruption detection operation on a most recent backup in each of the selected lineages according to the associated sample frequency;

determining whether a logical size of the most recent backups is less than or equal to a capacity threshold of the backup environment, wherein the selected lineages are pruned when the logical size is greater than the capacity threshold based on a criticality; and triggering the corruption detection operation dynamically based on metadata changes.

11. The method of claim 10, further comprising pruning based on a criticality of the selected lineages, wherein pruning includes one or more of:

skipping or delaying lineages with a lower sample frequency; and skipping or delaying lineages in a lower tier storage.

12. The method of claim 10, wherein the sample frequency does not apply to incremental backups, wherein the corruption detection operation is performed on a set of incremental backups.

13. A method for performing a corruption detection operation that includes read operations in a data protection system, comprising:

receiving the backups into the data protection stem configured to store the backups, wherein the backups are associated with corresponding lineages, wherein each of the lineages is associated with a sample frequency, wherein the sample frequency for some lineages is different from the sample frequency of other lineages;

selecting lineages subject to the corruption detection operation based on the sample frequencies of the lineages; and performing the corruption detection operation on a most recent backup in each of the selected lineages according to the associated sample frequency.

14. The method of claim 13, wherein the backups comprise synthetic full backups and/or always full backups and wherein the corruption detection operation is not performed on some of the backups in some of the lineages.

15. The method of claim 13, wherein the sample frequency is included in metadata associated with the backups.

16. The method of claim 13, further comprising selecting at least one of the lineages randomly rather than the associated sample frequency.

17. The method of claim 13, further comprising triggering dynamic scans based on metadata changes.

18. The method of claim 17, wherein metadata changes that trigger dynamic scans include a file size change greater than a threshold amount or an unexpected input/output (IO) pattern.

19. The method of claim 13, wherein the backup environment comprises a physical or virtual appliance that is accessed via an air gap.

* * * * *